United States Patent [19]
Clavenna et al.

[11] Patent Number: 5,476,877
[45] Date of Patent: Dec. 19, 1995

[54] PARTICULATE SOLIDS FOR CATALYST SUPPORTS AND HEAT TRANSFER MATERIALS

[75] Inventors: LeRoy R. Clavenna; Stephen M. Davis, both of Baton Rouge, La.; Rocco A. Fiato, Basking Ridge, N.J.; Geoffrey R. Say, Baton Rouge, La.

[73] Assignee: Exxon Research and Engineering Company, Florham Park, N.J.

[21] Appl. No.: 346,973

[22] Filed: Nov. 29, 1994

Related U.S. Application Data

[63] Continuation of Ser. No. 60,334, May 11, 1993, Pat. No. 5,395,813.

[51] Int. Cl.[6] .................................................. C07C 27/00
[52] U.S. Cl. .................... 518/703; 518/704; 518/711; 502/304; 502/335; 252/373
[58] Field of Search .................. 518/703, 704, 518/711; 252/373; 502/304, 335

[56] References Cited

U.S. PATENT DOCUMENTS

| | | | |
|---|---|---|---|
| 4,910,228 | 3/1990 | Lywood | 518/703 |
| 5,023,276 | 6/1991 | Yarrington et al. | 518/703 |
| 5,252,609 | 10/1993 | Pinto | 518/703 |
| 5,395,813 | 3/1995 | Clavenna et al. | 518/703 |

*Primary Examiner*—Werren B. Lone
*Attorney, Agent, or Firm*—Llewellyn A. Proctor; Jay Simon

[57] ABSTRACT

A particulate, precalcined low silica content zirconia, especially one stabilizer with yttria, is useful as a catalyst support or as a heat transfer solids component for conducting chemical reactions at high temperature, in oxidizing, reducing or hydrothermal conditions, especially in syn gas operations. An admixture of precalcined particulate low silica content zirconia, particularly a low silica content yttria-stabilized zirconia, is employed in a preferred embodiment as a heat transfer solid, in concentrations ranging generally from about 10 wt. % to about 99.9 wt. % with a particulate catalyst notably a nickel-on-alumina catalyst, in concentration ranging generally from about 0. 1 wt. % to about 90 wt. %. Such an admixture provides a particularly useful catalytic contact mass in high temperature oxidizing, reducing and hydrothermal environments, notably in conducting synthesis gas generation operations. This type of bed promotes continuous, highly efficient heat and mass transfer within the reacting gas phase. The presence of the heat transfer solid as a bed component maintains excellent bed fluidization characteristics, suppressing the normal tendency of the catalyst to sinter or agglomerate; tendencies which promote defluidization of the bed. Moreover, the heat transfer particles of the bed are highly attrition resistant, and are chemically compatible with the catalyst particles of the admixture.

13 Claims, No Drawings

PARTICULATE SOLIDS FOR CATALYST SUPPORTS AND HEAT TRANSFER MATERIALS

This is a continuation of application Ser. No. 060,334, filed May 11, 1993, now U.S. Pat. No. 5,395,813.

SPECIFICATION

1. Field of the Invention

This invention relates to a composition, or article of manufacture, characterized as catalysts, catalyst supports, heat transfer solids, or combinations of the catalysts with heat transfer solids to provide a fluidizable contact mass useful for conducting chemical reactions at high temperature, oxidizing, reducing and hydrothermal conditions, especially synthesis gas generation. In particular, it relates to processes utilizing contact masses constituted of admixtures of precalcined particulate zirconia, particularly a low silica content yttria stabilized zirconia, as a heat transfer solid, and a catalyst, notably a nickel-on-alumina catalyst, for conducting high temperature fluidized bed synthesis gas generation reactions.

2. Background

Processes which employ fluidized bed solids are well known to the chemical and petroleum industries. Known processes of this type include, in particular, those for producing synthesis gas, or syn gas (hydrogen and carbon monoxide) via the reaction of low molecular weight hydrocarbons, primarily methane, by contact with a bed of catalyst in the presence of steam (steam reforming process), or oxygen (partial oxidation process), or both steam and oxygen, at elevated temperature. Processes wherein low molecular weight hydrocarbons are converted to syn gas within a fluidized bed of catalyst in the presence of both steam and oxygen offer particular advantages in that the syn gas that is produced can be better controlled at hydrogen:carbon monoxide ratios particularly suitable for conducting Fischer-Tropsch reactions; i.e. at a hydrogen:carbon monoxide molar ratio of about 2:1.

Fluidized bed processes offer particular advantages in that they provide superior heat, and mass transfer characteristics as contrasted with fixed bed processes. They permit substantially isothermal reactor conditions in conducting exothermic and endothermic reactions, provided that the fluidized characteristics of the bed can be maintained throughout the operation. The extremely high temperatures required for syn gas generation however imposes special constraints on the types of bed materials which must, inter alia, resist melting and agglomeration which would lead to reduced fluidization quality, larger gas bubbles, and inferior mass transfer. The fluidization characteristics of the bed, for example, thus depends on the ability of particulate oxides, alumina and other refractory materials, which serve as bed components, to mechanically withstand the stress and strain of process operations. One important pathway to loss of fluidization relates to particle degradation. The amount of mechanical fracturing and attrition of the particles that can be tolerated during operations is necessarily limited. Fines will be lost from the bed.

Sintering and agglomeration of the fluid bed solids have also been found particularly important pathways for fluid bed degradation, and loss of catalyst activity in syn gas generation processes. Hot spots, particularly as occurs in the zones of oxygen injection, produce sintering and agglomeration of the particles. The temperatures in these zones far exceed the normally high temperature of reaction outside these zones, often by several hundred Fahrenheit degrees. Surface melting of the particle, for whatever reason, creates a tendency of the particles to fuse, or stick together to form agglomerates.

It has been heretofore disclosed that certain refractory solids can be added to a fluidized bed of catalyst in processes wherein hydrocarbons are reacted with steam and oxygen at temperatures ranging from about 1600° F. to 2000° F. (874° C. to 1093° C.) to maintain better fluidization qualities, and control sintering and agglomeration of the particles. The use of a fluidized bed constituted of an admixture of non catalytic refractory solids particles with catalytic solids particles to produce syn gas in a process of this type has resulted in improved overall operability and economic efficiency for producing syn gas relative to earlier processes which employed a fluidized bed of predominantly catalytic solids particles. Particulate solids, employed as heat transfer media, are typically refractory inorganic oxides which are resistant to melting and agglomeration at process conditions, e.g. alpha alumina, etc. Despite these successes, there nonetheless remains an acute need for further improving and maintaining the fluidization characteristics of the beds employed in such processes via the use of more effective catalysts, catalyst support solids, heat transfer solids, admixtures of catalysts and heat transfer solids, and the like.

DESCRIPTION OF THE INVENTION

The present invention is comprised of a fluidizable contact mass, or composition, and process of utilizing said contact mass, or composition, to provide improvements in the fluidization characteristics of a fluidized bed, or beds, constituted of said contact mass to promote highly efficient heat and mass transfer within the reacting gas phase; particularly in the fluidized bed, or beds, of an operation used for the production of syn gas at high temperature in the presence of steam, or oxygen, or both steam and oxygen. The contact mass is characterized generally as an admixture of a particulate, fluidizable precalcined zirconia a heat transfer solid which contains from 0 percent to about 1 percent silica, based on the weight of the zirconia, in concentration ranging from about 10 percent to about 99.9 percent, preferably from about 80 percent to about 99.5 percent, based on the total weight of the admixture, and a catalyst constituted of a refractory inorganic oxide support composited with a metal, or metals, component catalytic for the production of hydrogen and carbon monoxide from low molecular weight hydrocarbons, of fluidizable particle size in concentration ranging from about 0.1 percent to about 90 percent, preferably from about 0.5 percent to about 20 percent, based on the total weight of the admixture.

The contact mass, more particularly, embodies particulate zirconia, $ZrO_2$, of average particle diameter ranging from about 30 microns to about 150 microns, preferably from about 60 microns to about 90 microns, containing from about 0 percent to about 1.0 percent, preferably from about 0 percent to about 0.5 percent, silica, based on the weight of the zirconia, precalcined, preferably at temperature above about 1400° C.; and particularly, and preferably, a precalcined particulate zirconia of this type stabilized with about 1 percent to about 25 percent, preferably from about 2 percent to about 20 percent, yttria ($Y_2O_3$; or yttrium oxide), based on the weight of the zirconia. Precalcined particulate zirconias of these types, including particularly particulate yttria stabilized zirconia, have been found useful as catalyst supports, or carriers, with which can be composited, e.g. by impregnation or coprecipitation methods, a catalytically active metal, or metals, e.g. nickel, iron, platinum, ruthenium or the like, to form catalysts useful for the production of hydrogen and carbon monoxide from low molecular weight hydrocarbons contacted with a fluidized bed of the catalyst at high temperature hydrothermal conditions. Moreover, precalcined particulate zirconias of these types have been found particularly useful as heat transfer solids when used in admixture with catalytic particles to form a fluidized bed for syn gas production.

A particularly active and stable catalyst for use in syn gas generation operations can be made by the codeposition with nickel upon a particulate zirconia support of a stabilizing component, i.e. aluminum, or a lanthanum series metal (or metals), or zirconium, or yttrium; or mixture with nickel of any two or more of these metals, preferably a mixture with nickel of both aluminum and a lanthanum series metal (or metals), notably lanthanum, and more preferably a mixture with nickel of the aluminum and lanthanum series metal (or metals), as well as zirconium, or yttrium, or both zirconium and yttrium. Suitably, one or more of these metals are coimpregnated with nickel from a solution, suitably an aqueous solution, as soluble compounds upon a precalcined particulate zirconia support, the impregnated support then dried, and calcined at elevated temperature to form the catalyst. For example, water soluble salts of nickel and lanthanum, or nickel, lanthanum and aluminum, suitably as a nitrate, halide, oxyhalide or oxalate salt of each of the metals, respectively, are dissolved in water in concentration sufficient to provide the stoichiometric quantity of each of the respective metals desired for compositing with a given amount of the support. The solution, or solutions, of metal salts is then impregnated onto the particulate zirconia support, dried, e.g. in air at temperatures ranging between about 105° C. to about 120° C., and then calcined, typically in air, at temperatures ranging from about 300° C. to about 700° C., or higher. The weight amount of the metal, or metals, added with the nickel to the support in the finished catalyst (dry basis), calculated as metallic metal, will range per one part of nickel, calculated as metallic nickel, from about 0.05 to about 2 parts, preferably from about 0.1 to about 0.5 parts. The higher activity and stability of the catalyst, as contrasted with a catalyst otherwise similar except that no metal, or metals, is added with nickel to the support is believed the result of better dispersion of the nickel upon the particulate zirconia support.

In a preferred embodiment, the present invention is one comprising an admixture of particulate zirconia, as characterized, in concentration ranging from about 10 percent to about 99.9 percent, based on the total weight of the admixture, and a catalyst of average particle diameter ranging from about 30 microns to about 150 microns, preferably from about 60 microns to about 90 microns, in concentration ranging from about 0.1 percent to about 90 percent, based on the total weight of the admixture. In its preferred aspects the catalyst is constituted of a support, or carrier, notably a refractory inorganic oxide, particularly alumina, with which is composited a metal, or metals, e.g. nickel, iron, platinum, ruthenium or the like, catalytic for the production of hydrogen and carbon monoxide from low molecular weight hydrocarbons contacted with a fluidized bed of the catalyst at high temperature hydrothermal conditions, suitably a nickel-on-alumina catalyst, and preferably a nickel-on-alpha alumina catalyst, of particle size distributions corresponding to that of the zirconia. An admixture constituted of from about 10 percent to about 99.9 percent, preferably from about 80 percent to about 99.5 percent, of said precalcined particulate zirconia solid, and from about 0.1 percent to about 90 percent, preferably from about 0.5 percent to about 20 percent, of the catalyst, based on the total weight of the admixture (dry basis), can be fluidized at temperatures ranging to about 2600° F. (1437° C.), particularly at temperatures ranging between about 1600° F. and 2000° F. (874° C. to 1093° C.), and contacted with a low molecular weight hydrocarbon, e.g. $C_1$– $C_4$ alkanes, predominantly methane, in the presence of steam, or oxygen (air), or both steam and oxygen (air), to produce syn gas without significant sintering of the particulate zirconia or catalyst components of the admixture. Likewise, there is no significant disintegration of either component of the admixture to fines, or degradation of the particles of the admixture to produce agglomerates.

In a particularly preferred embodiment, the precalcined particulate zirconia contains from about 1 percent to about 25 percent, preferably from about 2 percent to about 20 percent, yttria, based on the weight of the zirconia. These zirconias, particularly a zirconia stabilized with yttria, displays superior agglomeration resistance with excellent structural integrity. The particles of zirconia are highly resistant to sintering, attrition and agglomeration per se, and impart high resistance to sintering, attrition and agglomeration of the catalyst. In other words, the admixture of particulate zirconia and catalyst as a system is highly resistant to sintering, attrition and agglomeration at extreme high temperatures, inclusive particularly of the severe high temperature hydrothermal conditions common to fluid bed syn gas operations.

The zirconia particles can be derived from a wide range of starting materials including, but not limited to, fused, tabular, or hydrous zirconium oxides produced by hydrolysis of zirconium compounds, or salts, zirconium halides, e.g. zirconium chlorides, zirconium oxychlorides, zirconium nitrite, zirconium nitrates, zirconium alkoxides and the like. Moreover, the source of zirconium is not limited to any particle morphology. For example, microporous spherical spray dried particles and fused and/or tabular type oxide particles can be produced with appropriate properties. When spray dried zirconias are employed, it is within the scope of this invention to incorporate minor amounts of a second refractory oxide as a binder to improve particle strength, e.g. silica, alumina, or mixtures thereof; albeit when silica is used its concentration should not exceed about 1.0 percent, and preferably should not exceed about 0.5 percent, based on the weight of the zirconia (dry basis). The purity of the zirconia, whatever other component may be present, will be greater than about 98 percent, i.e. will range from about 98 percent to about 100 percent, preferably from about 99 percent to about 100 percent, based on the weight of the zirconia (dry basis). The yttria stabilizer can be incorporated at any stage of preparation of the particulate zirconia, e.g. by coprecipitating yttria in a zirconium hydroxide gel prior to spray drying, by dry mixing a yttria powder with zirconia hydrous oxide gel prior to spray drying and calcination, by impregnating a yttrium oxide precursor onto the surface of particulate zirconia prior to calcination, or by sintering zirconia and yttria powders at high temperature followed by grinding and classification to recover suitable size distributions of stabilized zirconia particles. The zirconia particles, prior to use, are calcined in the presence of air, or nitrogen for periods ranging from about 0.5 to about 24 hours, preferably from about 4 to about 16 hours, at high temperature, preferably at temperature above about 1400° C., and more preferably at temperature above about 1500° C. The attrition resistance of the zirconia particles, measured in terms of the "Davison Attrition Index", D.I., will in any of its forms be less than about 15, preferably less than 10.

The catalyst component of the fluidized bed contains generally from about 1 percent to about 20 percent nickel, preferably from about 5 percent to about 10 percent nickel, composited with an alumina support, preferably an alpha alumina support. The mean average diameter of the catalyst particles ranges from about 30 microns to about 150 microns, preferably from about 60 microns to about 90 microns; particles of size distribution which can be readily fluidized along with the zirconia particles and contacted, e.g. with a light hydrocarbon feed, $C_1$–$C_4$ alkanes, predominantly methane and steam, or methane and an oxygen-containing gas (air), or methane and both steam and oxygen, at elevated temperature sufficient to convert the hydrocarbon feed to syn gas without significant degradation of the particles of the bed to fines, and without sintering, or catalyst agglomeration.

This invention will be better understood via the following illustrative examples, which demonstrate specific and preferred embodiments.

EXAMPLES 1–11

A series of runs were made with different, paired specimens of particulate zirconias of average particle diameter ranging between about 45 and 106 microns at conditions simulating those which occur in the bed of a large fluidized bed syn gas generation pilot plant. In conducting these tests, the first specimen of a pair was subjected to treatment in a jet attritor to determine the Davison Attrition Index, D.I., of the particles; a measure of attrition resistance of a particle which has been found to correlate well with the attrition, and production of fines which occurs in a large fluidized bed syn gas generation pilot plant.

The Davison Index, D.I., was determined by an attrition index method based on that developed by Davison Chemical Division of W. R. Grace & Company. The method uses a jet cup attrition technique that reports as the D.I. the wt % of <20 μm fines produced in a controlled attrition test. The D.I. test apparatus consists of two main vessels, the attrition vessel and the elutriation vessel. The attrition and elutriation vessels have diameters of 9 in. and 4.5 in., respectively. The jet cup attritor which holds the sample for attrition attaches to the bottom of the attrition vessel and is 1.03 in. I.D. A 0.0625 in. diameter hole forms the jet that enters the cup's wall horizontally and is tangent to the inside wall and bottom of the cup. A sample of 6±0.3 g is attrited for 20 minutes with $N_2$ (35% relative humidity) at a flow rate of about 21 Liters/minute, L/min (this flow rate is fine-tuned to give a D.I. of 27±2 for a standard CZB-1 Davison catalyst). Fines escaping the attrition vessel are collected in an extraction thimble. After the attrition the sample is fluidized with the humidified $N_2$ at 9 L/min for 20 min. in the elutriation vessel to remove and collect the remainder of the <20 μm fines. The D.I. represents the wt % of <20 μm fines formed by the attrition relative to the >20 μm fraction in the preattrited sample.

The second specimen of the pair was divided into two portions and each portion subjected to agglomeration and sintering tests at 1500° C. and 1600° C., respectively. Each of the two portions of the specimen, a portion weighing about 8 to 10 grams, was placed in a Coor's alumina boat, put into a high temperature Lindbergh furnace heated from room temperatures to 1500° C. and 1600° C., respectively, over a period of about 90 minutes, and then held at this temperature for two hours to induce thermal agglomeration. Each portion of the specimen was then cooled over a period of about 6 to 12 hours to about 100° C., removed from the furnace, and then transferred to a sonic sieve operated at constant power. Measurement by weighing the fraction collected on a 150 mesh size screen was then made to determine the conversion of the 45 to 106 micron particles to fused agglomerates greater than 106 microns in size. The analyses showed a considerable difference between each of the several specimens in terms of their attrition resistance, and their agglomeration and sintering resistance. The first and second columns of the table identifies the specimens of particulate zirconia tested, and in general terms the source of the specimen. The third column gives the morphology of the specimen, the fourth column the silica content in terms of weight percent, the fifth column the Davison Attrition Index and the sixth column the weight percent of agglomerates at 1500° C. and 1600° C., respectively.

TABLE

| Specimen No. | Material | Source Manufacturer | Morphology | $SiO_2$ Content, Wt. % | Davison Attrition Index | Agglomeration Wt. % Particles > 106 Microns | |
|---|---|---|---|---|---|---|---|
| | | | | | | 1500° C. | 1600° C. |
| 1. | Zirconium Silicate | A | Tabular $ZrSiO_4$ | 35.2 | 3.0 | 73 | — |
| 2. | Zirconium Silicate | A | Tabular $ZrAlSiO_x$ | 27.3 | 1.1 | 53 | — |
| 3. | Calcium Stabilized Zirconia | B | Microporous | — | 17.6 | 99 | — |
| 4. | Yttria Stabilized Zirconia | B | Microporous | 0.62 | 9.6 | 2 | 12 |
| 5. | Calcium Stabilized Zirconia | C | Tabular | 0.15 | 0.8 | — | 99 |
| 6. | Magnesium Stabilized Zirconia | C | Tabular | 0.04 | 1.5 | — | 99 |
| 7. | Zirconia | D | Spray Dried Spheres | 0.46 | 32 | 1 | 4 |
| 8.* | Zirconia | E | Spray Dried | 3.1 | 12 | — | 99 |
| 9.* | Zirconia | E | Spray Dried | 0.80 | 49 | — | 39 |
| 10.* | Zirconia | E | Spray Dried | 3.1 | 3.8 | — | 99 |
| 11.* | Zirconia | E | Spray Dried | 0.91 | 13 | — | 9 |

*Note Specimens 8 and 9 were precalcined in air for several hours at 1350° C., and Specimens 10 and 11 were precalcined in air for several hours at 1450° C., as final step of the preparation.

In consideration of these data, it is evident that the properties of these specimens are quite different relative to their ability to resist attrition, sintering and agglomeration. In the production of syn gas in fluidized bed operations the strength of the particles are particularly important. Fines will be entrained, and removed from the bed regardless of the presence of cyclones used for fines recovery. This represents waste, and leads to fouling of downstream equipment, e.g. heat exchangers. D.I. of greater than 15 are unacceptable, and preferably the D.I. should be less than 10. High silica concentrations cause sintering and agglomeration of the particles, and silica concentrations above about 1 percent are, for this reason, unacceptable. Silica concentration, suitably, should range no higher than about 1 percent; and preferably should range no higher than about 0.5 percent.

These data show that zirconia with silica contents less than about 1 wt. % displayed superior agglomerization resistance. Yttria stabilized zirconia also displayed excellent agglomeration resistance. Calcination temperatures above 1400° C. provided improved attrition and agglomeration resistance.

It is apparent that various modifications and changes can be made without departing the spirit and scope of the invention.

Having described the invention, what is claimed is:

1. In a process for the production of hydrogen and carbon monoxide from a low molecular weight hydrocarbon by contact with a fluidized bed of catalyst at elevated temperature in the presence of steam, or oxygen, or both steam and oxygen, the improvement wherein the fluidized bed is comprised of an admixture of a particulate, fluidizable precalcined zirconia heat transfer solid which contains from about 0 percent to about 1 percent silica, based on the weight of the zirconia, in concentration ranging from about 10 percent to about 99.9 percent, based on the total weight of the admixture, wherein the zirconia component of the admixture has a Davison Index measurement of not greater than about 15 and a catalyst constituted of a refractory inorganic oxide support composited with a metal, or metals, component catalytic for the production of hydrogen and carbon monoxide from low molecular weight hydrocarbons, of fluidizable particle size in concentration ranging from about 0.1 percent to about 90 percent, based on the total weight of the admixture.

2. The process of claim 1 wherein the average particle diameter of both the zirconia and catalyst therefor components of the admixture ranges from about 30 microns to about 150 microns.

3. The process of claim 1 wherein the average particle diameter of both the zirconia and catalyst therefor components of the admixture ranges from about 60 microns to about 90 microns, the concentration of the zirconia component of the admixture ranges from about 80 percent to about 99.5 percent, and the catalyst component ranges from about 0.5 percent to about 20 percent.

4. The process of claim 1 wherein the zirconia component of the admixture is stabilized with yttria.

5. The process of claim 4 wherein the yttria is present within the zirconia in concentration ranging from about 1 percent to about 25 percent, based on the weight of the zirconia.

6. The process of claim 5 wherein the yttria is present within the zirconia in concentration ranging from about 2 percent to about 20 percent.

7. The process of claim 1 wherein the catalyst component of the admixture is comprised of nickel-on-alpha alumina, and the catalyst contains from about 1 percent to about 20 percent nickel, based on the weight of the catalyst.

8. The process of claim 1 wherein the catalyst component of the admixture is constituted of a zirconia support with which the catalytic metal, or metals, is composited.

9. The process of claim 8 wherein aluminum, or a lanthanum series metal, or zirconium, or yttrium, or admixture of two or more of these metals, is codeposited with nickel on the particulate zirconia.

10. The process of claim 1 wherein the average particle diameter of the zirconia component of the admixture ranges from about 60 microns to about 90 microns, contains from 0 percent to about 0.5 percent silica, from about 2 percent to about 20 percent yttria, and the zirconia component of the admixture ranges in concentration from about 80 percent to about 99.5 percent within the admixture; and the catalyst component of the admixture is nickel on alpha-alumina containing from about 5 percent to about 10 percent nickel, and is present within the admixture in concentration ranging from about 0.5 percent to about 20 percent.

11. The composition of claim 1 wherein the zirconia component of the admixture has a Davison Index measurement of less than about 10.

12. The composition of claim 1 wherein the zirconia component of the admixture contains from 0 percent to about 0.5 percent silica.

13. The composition of claim 1 wherein the zirconia component of the admixture is precalcined at temperature above about 1400° C.

* * * * *